July 6, 1937.  A. W. HERRINGTON  2,086,500
AXLE STRUCTURE
Filed July 30, 1934  2 Sheets-Sheet 2

INVENTOR
*Arthur W. Herrington,*
BY *Hood & Hahn*
ATTORNEYS

Patented July 6, 1937

2,086,500

UNITED STATES PATENT OFFICE 2,086,500

AXLE STRUCTURE

Arthur W. Herrington, Indianapolis, Ind., assignor to Marmon-Herrington Company, Inc., Indianapolis, Ind., a corporation of Indiana Application July 30, 1934, Serial No. 737,513

11 Claims. (Cl. 180—43)

The primary object of my invention is to provide a design for an automobile axle of the power-driven steering wheel type which may be accurately produced, in unusually sturdy form, at reduced cost.

Further objects of my invention are to provide the various improvements in details of construction hereinafter pointed out.

The accompanying drawings illustrate my invention.

Figure 1:
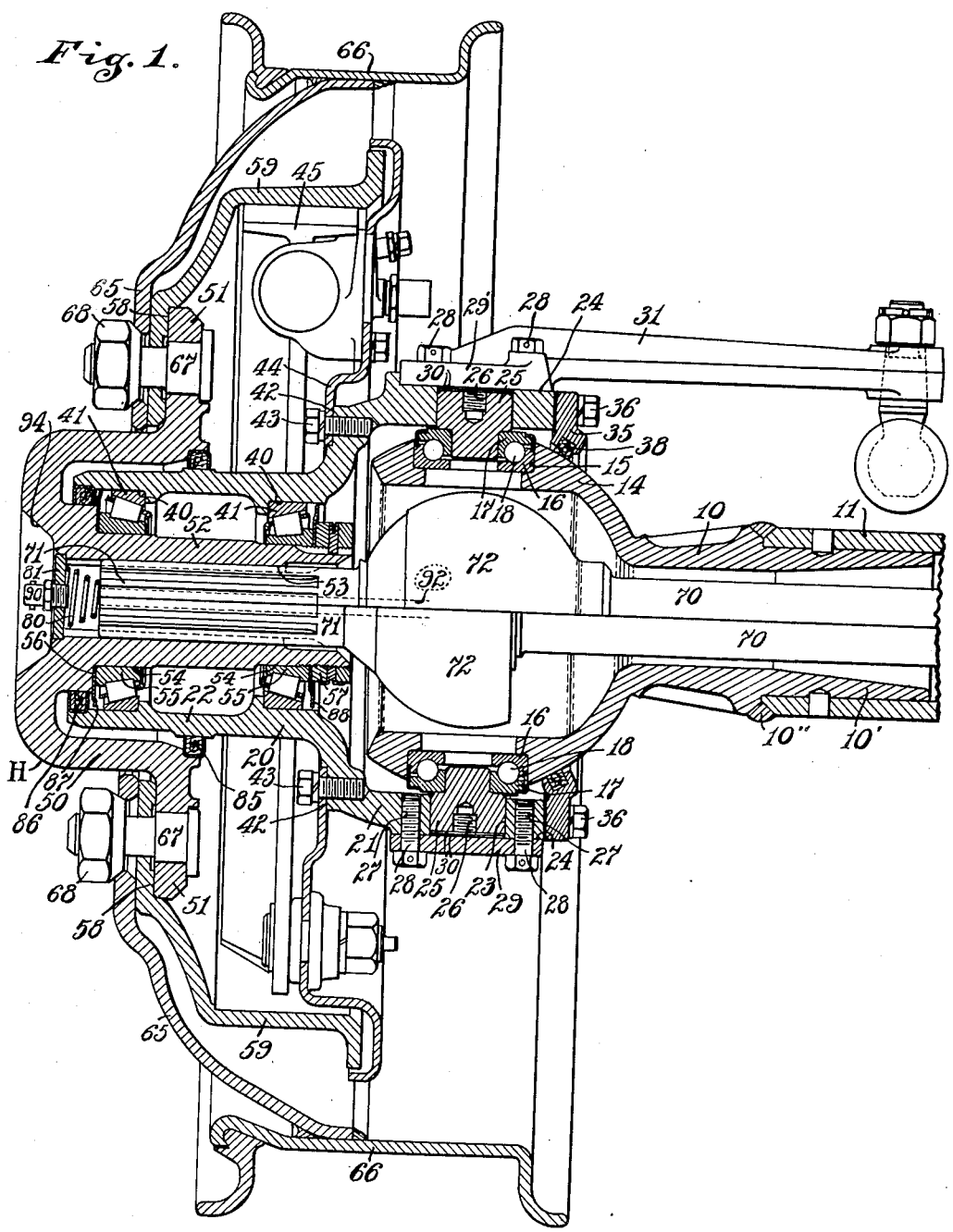
Fig. 1 is an axial section in the vertical plane of one end of embodiments of my improved structure, the upper half showing one arrangement of wheel rim and universal joint and the lower half showing another arrangement of those parts.
Figure 2:
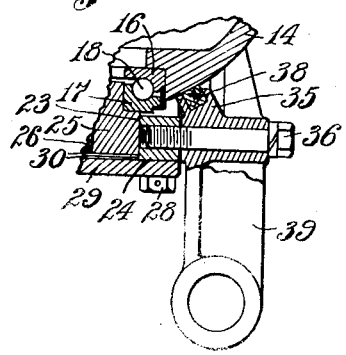
Fig. 2 is a fragmentary sectional detail showing the arm to which is pivoted the usual stretcher rod (not shown) for connecting two steering wheels.

In the drawings 10 indicates one end of the middle, or main, shell 11 of an axle of the power-driven steering wheel type, said main shell, as will be understood, having a middle enlarged portion (not shown) within which is journalled an appropriate differential gearing.

Figure 3:
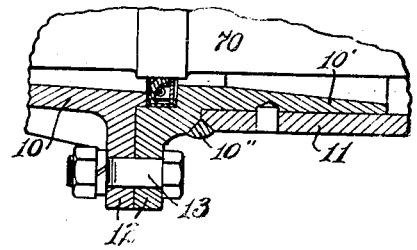
Fig. 3 is a fragmentary sectional detail showing a modification in the structure of the main shell of the axle casing.

The precise manner by which part 10 is made a rigid portion of the main shell is immaterial, although for convenience in machining, said part 10 is initially non-integral with part 11. For instance, in Fig. 1, part 10 has a portion 10' sleeved into shell 11 and is welded thereto, as indicated at 10'', whereas, in Fig. 3, parts 10 and 11 are provided with mating flanges 12 which are connected by bolts 13.

Part 10, at its outer end is a hollow spherical segment 14 having diametrically-opposed vertical-axis, outwardly-faced bearing pockets 15 for the reception of ball bearings comprising the rings 16, 17 and balls 18.

Supplementing the shell 11—10, at each end, is a sleevelike swinging housing 20, having a cylinder end 21, into which segment 14 projects, and a cylindrical end 22 within which the wheel hub is journaled.

Part 21 of housing 20 is provided with diametrically-opposed perforations 23 each flanked, at its outer end by a flat annular seat 24 and press-fitted into each perforation is a trunnion pin 25 having an ensmalled inner end projecting into the adjacent bearing ring 17. Each pin 25, at its outer end, is provided with a threaded pocket 26 for the reception of pulling mechanism (not shown) necessary to outwardly extract the trunnion pins.

The annular seats 24 are pierced by threaded perforations 27 for the reception of threaded cap screws 28.

Three of the four trunnion pins (for two wheels) are each vertically positioned by a plate 29, through which screws 28 pass, and shims 30 (more or less) interposed either between plate 29 and the trunnion pin, as shown, or between the plate and the seat 24.

One of the upper trunnion pins is vertically positioned by a plate 29' which is integral with the steering arm 31 which is connected by the usual linkage with the steering post, intermediate shims 30, more or less, being used when necessary.

It is highly important that the trunnion pins be produced to a high degree of accuracy in order that their axes may be accurately in line with each other and with the axis of the universal joint (to be described), which forms part of the power shaft, and that they be non-corrodible. It is for those reasons that I make the trunnion pins separate from the plates 29, or 29'; as by so doing these pins may be readily accurately ground and may be made of a relatively expensive material, such as high chrome steel, without unduly adding to the cost of production.

It will be readily understood that if that one of the trunnion pins which is immediately associated with arm 31 were integral therewith, much unnecessary expense would be involved in making the entire piece of such expensive material and, in any event, such integrality would practically prevent accurate grinding of the pin portion.

Non-integrality of the trunnion pins and their retaining plates also avoids possibility of unduly stressing the parts by stresses exerted through the cap screws 28, and avoids unnecessary expense as to plates 29.

The housing 20 is not split vertically, as has heretofore been the custom, but is an integral element, generally cylindrical in form so that it may be readily and accurately machined. The portion 21 is open at its inner end so as to sleeve over ball 14 and is supplemented by a ring 35, held in place by cap screws 36, in which is an annular felt packing 38 engaging ball 14 to exclude dirt and water. Preferably integral with each ring 35 is a stretcher-rod-arm 39 to which a stretcher-rod may be pivoted.

Within portion 22 of housing 20 are two annular bearing pockets 40, 40, preferably oppositely faced, for the reception of the outer races 41 of roller bearings.

Housing 20, at the junction between its portions 21 and 22 is provided with an annular seat 42 upon which is secured, by cap screws 43, the backing plate 44 of the brake assembly 45. The details of this brake assembly form no part of my present invention and it is therefore only illustrated diagrammatically.

The wheel hub H (wheel driving flange) comprises a cup-like portion 50, which is sleeved over the outer end of portion 22 of housing 20; an external annular flange 51; and an axial sleeve 52 which is internally splined as indicated at 53.

Externally, sleeve 52 is provided with bearing race seats 54, 54 for the reception of the inner races 55, 55 of the roller bearings previously mentioned.

The outer seat 54 is flanked by the annular shoulder 56 and the inner seat 54 is flanked by threads upon which is mounted the nut 57 by which the roller bearings may be adjusted.

The flange 51 is provided with an outwardly-facing annular seat 58 for the reception of the brake drum 59, detachably retained in place thereon by comparatively light screws 60 passing therethrough into threaded perforations in flange 51.

The carrying plate 65 for the wheel rim 66 sleeves over cup 50 overlying the brake drum, and the wheel torque and brake-drum torque are taken by heavy bolts 67 projecting outwardly through flange 51 and having outwardly-removable nuts 68 engaging plate 65.

It will be noted that the brake-drum being mounted upon the outer face of flange 51 it is possible to remove the brake drum, for adjustment or repair of the brake unit, without disturbing anything but the wheel proper, nuts 68 and screws 60.

Mounted within each end of the above-described structure is a driving shaft structure comprising an inner shaft section 70, an outer shaft section 71, and an intermediate universal joint 72, preferably of the uniform velocity type. The shaft sections 70 and 71 have splined ends which non-rotatively engage the differential gearing and splines 53, respectively, in a manner permitting axial movement.

In the upper half of Fig. 1 the female element of the universal joint 72 is shown as carried by shaft section 70 and the male element by shaft section 71, while in the lower half of Fig. 1 these universal joint elements are shown reversed. In the lower part of Fig. 1 rim 66 is shown somewhat wider than it is in the upper part.

It is important that the center of the universal joint 72 be accurately in the plane of the axes of the two shaft sections 70, 71 and this is insured by proper axial adjustment of the trunnion pins.

It is also important that the center of joint 72 be accurately in the line of the axes of the trunnion pins, but it is extremely difficult to so adjust the parts.

I therefore provide room for concurrent axial shifting of the shaft units and arrange a light compression spring 80 to act upon the outer end of each shaft section 71, said spring abutting plate 81 which closes the outer end of the splined bore of sleeve 52 and is held in place by any suitable means, as by peening.

Figure 4:
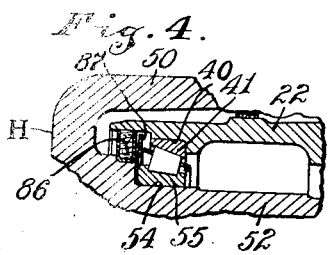
Fig. 4 is a fragmentary sectional detail, showing a modification of bearing seal.
Figure 5:
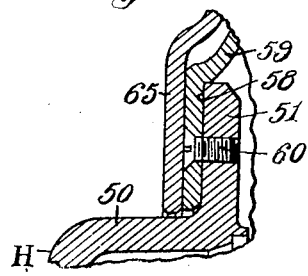
Fig. 5 is a fragmentary sectional view of a part of the brake-drum and adjacent parts.

An annular dust seal 85 in the mouth of cup 50 and an annular dust seal 86 in the outer end of portion 22 of housing 20, provide a double seal against dirt and water entering the wheel bearings. It will be readily understood that those sealing rings may be reversed, as indicated at 86 in Fig. 4.

Further protection is provided by a thin metal ring 87 between shoulder 56 and adjacent bearing race 55, and ring 88 between nut 57 and adjacent bearing race 55.

The entire interior of housing 20 and ball 14 may be lubricated through a single fitting 90 in plate 81 and a bore 92 through shaft section 71 into the universal joint.

The bearings for hub H are packed with suitable grease for extended operation, and the lubrication thrown centrifugally from the universal joint provides sufficient lubrication for the trunnion bearings.

Each of the housings 20 is provided with the usual stretcher-bar arm (not shown) in the axial plane and substantially at right angles to arm 31, to be connected by the usual stretcher-bar.

It will be noted that the outer races 41 of the wheel bearings are non-rotative and that consequently roller speed, relative to wheel speed, is much less than it would be in bearings of equal diameter but having fixed inner races, as would be the case if the wheel bearings were on the outside of housing part 22. Arrangement of the wheel bearings within part 22 also affords opportunity for the double seal 85—86.

It will be noted that provision of the sleeve portion 52 of the hub H affords ample room for a wide separation of the two roller bearings, while provision of the cup portion 50, sleeved over the outer end of the housing 20, together with the circumferential flange 51, makes possible a thorough protection of the nuts 68, said nuts lying in a plane well inside of the plane of the outer end of hub H. Hub H has a smooth outer end and rounded corners and has ample thickness to afford a sufficient depth for the protective pocket 94 and, without unduly extending the lateral extent of the structure as a whole, lies in the position where, if brought into collision with portions of the terrain will effectively guard the nuts 68 so that they cannot become battered in service.

This is an especially important feature, especially in connection with war vehicles which must be driven over rough country and which in times of emergency must afford ease of removal of wheels and brake drums.

The hub H, for war vehicles especially, may be readily formed of a steel forging which may be heat treated and the character of the cup portion 50 with its flange 51 is such as to afford a maximum of bullet proof protection to the vulnerable portions such as the wheel bearings, trunnion bearings and universal joints.

I claim as my invention:

1. An axle structure comprising a main shell having a ball end, a swiveled housing with its inner end sleeved over said ball end and its outer end provided with axially-spaced internal bearing pockets, swiveling connections between said ball end and housing, a wheel hub having an axially internally-splined sleeve projecting through said bearing pockets, a cup portion sleeved over the outer end of the swiveled housing, and an external circumferential flange in a plane between said pockets, bearings in said pockets for said axial sleeve, a shaft structure comprising a shaft section splined and freely axially movable within said hub sleeve, the shaft section rotatable within the main shell, an intermediate universal joint within the ball end of the main shell, and an axially adjustable element carried by the inner end of said sleeve and engaging the inner bearing.

2. An axle structure comprising a main shell having a ball end, a swiveled housing with its inner end sleeved over said ball end and its outer end provided with axially-spaced internal bearing pockets, swiveling connections between said ball end and housing, a wheel hub having an axially internally-splined sleeve projecting through said bearing pockets, a cup portion sleeved over the outer end of the swiveled housing, an external circumferential flange in a plane between said pockets, bearings in said pockets for said axial sleeve, a shaft structure comprising a shaft section splined and freely axially movable within said hub sleeve, the shaft section rotatable within the main shell, an intermediate universal joint within the ball end of the main shell, and an axially adjustable element carried by the inner end of said sleeve and engaging the inner bearing, and a compression spring interposed between the outer end of said first-mentioned shaft section and the wheel hub.

3. As an article of manufacture, a power delivering element for automobile axles comprising an axially splined tubular portion and an integral cup portion at one end with the circumferential wall of the cup portion overlying and radially spaced from said tubular portion and carrying an external circumferential flange, said tubular portion having two axially-spaced external bearing seats one of which is within the cup portion, the plane of said flange being between the planes of the two bearing seats.

4. An axial structure comprising a tubular casing element, a power-delivery element having a portion sleeved within the outer end of said casing element and an integral cup portion sleeved over the outer end of said casing element and formed externally to receive a wheel, bearing means interposed between said casing element and power-delivery element having an effective axial extent intersected by the plane of the said wheel-receiving formation, and adjustable means within the inner end of the casing element and at the inner end of said sleeved portion for determining the relative axial relation of said casing and sleeved portion.

5. An axle structure comprising a tubular casing element, a power-delivery element having a portion sleeved within the outer end of said casing element and an integral cup portion sleeved over the outer end of said casing element and an external wheel-receiving flange, two oppositely-facing axially-spaced bearings interposed between said casing element and power-delivery element and capable of resisting axial thrust, one upon each side of the plane of said flange, and removable means at the inner end of said sleeved portion restraining outward axial movement of said power-delivery element.

6. An axle structure comprising a main shell, a tubular swiveled housing swiveled at its inner end upon the outer end of the main shell, said swiveled housing being provided at its outer end with a tubular portion having internal bearing pockets, a wheel hub having an axially internally-splined sleeve projecting through said bearing pockets, an integral cup portion sleeved over the outer end of the swiveled housing, and an external circumferential flange in a plane between said bearing pockets, bearings in said pockets for said axial sleeve, means at the inner end of said sleeve for holding the hub against outward axial removal and a shaft structure comprising a shaft section splined and freely axially movable within said hub sleeve, a shaft section rotatable within the main shell, and an intermediate universal joint within the swiveling connection between the main shell and swiveled housing.

7. An axle structure comprising a main shell, a tubular swiveled housing swiveled at its inner end upon the outer end of the main shell, said swiveled housing being provided at its outer end with a tubular portion having internal bearing pockets, a wheel hub having an axially internally-splined sleeve projecting through said bearing pockets, an integral cup portion sleeved over the outer end of the swiveled housing, and an external circumferential flange in a plane between said bearing pockets, bearings in said pockets for said axial sleeve, means at the inner end of said sleeve for holding the hub against outward axial removal, a shaft structure comprising a shaft section splined and axially movable within said hub sleeve, a shaft section rotatable within the main shell, and an intermediate universal joint within the swiveling connection between the main shell and swiveled housing, and a compression spring interposed between the outer end of said first-mentioned shaft section and the wheel hub.

8. An axle structure comprising a main shell, and a swiveled housing the adjacent ends of which are sleeved one within the other, and the outer member pierced by upper and lower perforations, upper and lower bearings carried by the inner member registering with said perforations, upper and lower trunnion pins sleeved in said perforations and projecting axially into said bearings and engaging the same to resist axial thrust, two independent cover plates each forming a non-integral abutment for the outer end of one of said trunnion pins, and means clamping said plates upon said outer member.

9. An axle structure comprising a main shell having a hollow ball end, a swiveled housing with its inner end sleeved over said ball end and provided with upper and lower perforations, upper and lower bearings carried by said ball end within the swiveled housing, upper and lower trunnion pins sleeved in said perforations and projecting axially into said bearings and engaging the same to resist axial thrust, two independent cover plates each forming a non-integral abutment for the outer end of one of said trunnion pins, and means for clamping said plates upon the swiveled housing.

10. An axle structure comprising a main shell having a hollow ball end, a swiveled housing with its inner end sleeved over said ball end, a swivel connection between said ball end and housing, internal bearing pockets formed within the outer end of said housing, bearings capable of resisting axial thrust mounted in said pockets, a wheel hub comprising an internally-splined tubular axial portion supported within and by said bearings and a cup portion sleeved over the outer end of said housing, and a driving shaft section splined and freely axially movable within said tubular axial portion.

11. An axle structure comprising a main shell having a hollow ball end, a swiveled housing with its inner end sleeved over said ball end, a swivel connection between said ball end and housing, internal bearing pockets formed within the outer end of said housing, bearings capable of resisting axial thrust mounted in said pockets, a wheel hub comprising an internally-splined tubular axial portion supported within and by said bearings and a cup portion sleeved over the outer end of said housing, a driving shaft section splined and freely axially movable within said tubular axial portion, and a compression spring interposed between the said wheel hub and the outer end of said shaft section.

ARTHUR W. HERRINGTON.